Patented June 26, 1934

1,964,283

UNITED STATES PATENT OFFICE 1,964,283

INSECTICIDAL COMPOSITION AND METHOD FOR PREPARING THE SAME

Karl H. Fulton, Jackson Heights, N. Y., assignor to Combustion Utilities Corporation, New York, N. Y., a corporation of Maine No Drawing. Application November 17, 1930, Serial No. 496,353

7 Claims. (Cl. 167—14)

This invention relates to insecticides and more especially it relates to such preparations adapted to be employed in the form of a liquid spray for application to vegetation such as fruit trees and the like for the purpose of inhibiting the growth of and destroying many species of destructive insects, thus promoting a healthy growth of vegetation and a high yield of fruit. The invention is of special utility in connection with insecticides employed in exterminating insect pests of the sucking variety such as various kinds of Aphis and leaf-hoppers.

Among the various objects of the present invention are to provide an insecticidal spray having an unusually high spreading power; to provide a novel insecticide spray comprising a product formed by the incomplete combustion of hydrocarbons and which when applied to various forms of plant life will not injure the plants nor affect their growth; to provide in an improved manner for increasing the spreading and wetting power of insecticidal preparations adapted to be sprayed upon vegetation; and to provide in an improved manner for activating an insecticidal agency present in a composition so as to produce certain physical changes therein independent of chemical reaction between the ingredients of the composition.

It is common knowledge that an insecticidal spray should not only be non-injurious to foilage under all climatic conditions in effective dilutions but it should be readily mixable with a variety of natural waters. Moreover, to be adapted for use against sucking insects the toxic components of the insecticidal composition should readily cover and wet the foliage, and should wet and adhere in the form of a film to the body of the insect as well as penetrate the latter. In the past many attempts have been made to increase the spreading property of liquid spray insecticides and also to increase their property of wetting the bodies of the insects to be destroyed, which is essential if maximum results are to be obtained. Various forms of soaps, sulfonated oils, and other emulsifying agents have been employed for the purpose of effecting these results.

According to the present invention a very effective insecticidal composition may be prepared, an essential ingredient of which is a solid product produced by the incomplete combustion of hydrocarbons, such as gas black, produced by the partial combustion of a gaseous hydrocarbon or a mixture thereof, such as natural gas. It has been determined that suspensions of carbon black in an aqueous solution or water in the presence of an emulsifying agent preferably having insecticidal properties such, for example, as whale oil soap,—not only greatly increases the spreading power of the mixture when employed in the usual commercial types of spray rig but, in addition to this, acts as an activator for the insecticidal agency employed. For instance, it is well known that in order for whale oil soap to function satisfactorily per se, as an insecticide, it must be employed in amounts in the neighborhood of 5% and upward of the spray mixture employed. On the other hand spray mixtures in accordance with the present invention and containing but .4% of whale oil soap as the insecticide have given satisfactory kills against such insects as the Green and Black Aphis, the Red Cactus Aphis, and Pear Tree Psylla, in the presence of relatively small amounts, such as .3%, of carbon black. The balance of the composition may consist of water. The insecticide—in this case, whale oil soap,—appears to be carried by the finely-divided carbon black to all parts of the foilage so as to cover the same and the body of the insects thereon in a very effective manner. Apparently the carbon black itself exerts a toxic influence upon the insects, possibly due to its smothering or clogging action resulting in suffocation. Neither the carbon black nor the whale oil soap has a burning action or other undesirable effect upon the most delicate plants sprayed therewith and therefore may be used in any desired concentration without injury to the plants sprayed therewith. This is quite contrary to the results ordinarily obtained where various emulsified oils and the like are used in insecticidal preparations for similar purposes. In many of the latter preparations it is essential to use extremely small amounts of the oils to avoid the burning action thereof upon the foliage and therefore to add small quantities of toxic agents such as nicotine sulphate to the emulsified oils in order to produce a composition capable of killing the insects without burning the leaves. The insecticidal composition in the diluted form in which it is applied to the vegetation is in the form of a permanent suspension which does not require constant agitation in the spray rig during the time of its application. This is an important feature of the composition and in contrast to the usual type of insecticides, including many so called oil emulsions which must be constantly agitated within the spray rig to prevent segregation of portions of the oil from other of the ingredients thereof.

The following specific examples illustrate certain preferred forms of the invention in which an effective insecticidal composition is prepared from carbon black and an emulsifying agent such as, whale oil soap in small concentrations. The invention however is not to be regarded as limited by the examples but the scope thereof is more clearly defined in the appended claims.

Example 1

39 lbs. of whale oil soap is mixed with sufficient hot water to dissolve the same, 31 lbs. of carbon black are then added to the mixture with stirring, during which time additional water either cold or hot may be added until the total water content of the mixture reaches 130 lbs. The mixture is now of a pasty consistency and may be transported in this form to the point of use. It is very readily deflocculated in the presence of additional water, providing an aqueous suspension of carbon black which is an effective spreading and activating agent for the specific insecticide employed. An aqueous solution containing 2% of the above pasty insecticidal composition was sprayed upon nursery trees by a standard type of commercial spray rig comprising a pump operating at 125 lbs. per sq. inch, the pressure effecting the atomization of the solution. The trees in question were infested with Green, Black and Wooly Aphis. Close to 100% killing was effected upon the first application of this mixture and a second application three days later gave a 100% killing with no trace whatever of burning or other injury to the vegetation. This insecticide evidently has a somewhat delayed action, and the kill appears to be effected around the second day after application of the insecticide.

In place of all or a portion of the whale oil soap, other emulsifying agents especially those having insecticidal properties, such as alkali metal soaps and the like may be employed together with carbon black in aqueous suspension. Furthermore to these mixtures, including that set forth in the above specific example, may be added small amounts of other well known insecticidal agencies which are substantially soluble in water and adapted to exert their toxic influence when in an aqueous suspension containing carbon black or the like, such as here employed. As examples of such toxic materials may be mentioned nicotine, nicotine sulphate, pyrethrum, and the like. In view of the peculiar effectiveness of the carbon black in activating the insecticidal agency employed, and because of the former's additional function in greatly increasing the spreading power of the insecticidal composition,—the said insecticidal agency,—that is the nicotine sulphate or the like,—may be effectively employed in much smaller amounts than would be the case where the carbon black is not employed. For example, an effective insecticidal preparation may be prepared by mixing together the following ingredients:

31 parts by weight of carbon black, 39 parts of whale oil soap, 1 part of nicotine and 130 parts of water. This gives a product in which after dilution with water to yield a 3% solution, the nicotine is present in the final emulsion or aqueous suspension in about 1/60%. Other well known insecticides, such as lead or calcium arsenates in finely divided form may be added in relatively small quantities to the present insecticidal composition comprising carbon black. Normally these arsenates are used in amounts approximately equal to one-fourth of the total of the other solid ingredients of the insecticidal composition. As thus employed they may be easily spread upon the vegetation to be treated.

It is of course not essential that the exact proportions of finely divided carbon such as carbon black and the emulsifying agent and insecticidal agencies disclosed above be employed. On the contrary the amounts of carbon black and of water-soluble emulsifying agent may be varied within fairly wide limits. For instance, highly satisfactory results may be obtained employing an aqueous solution containing 2% of a mixture prepared by mixing 46 parts of carbon black, 39 parts of whale oil soap and 100 parts of water. Where the small amounts of water are employed, the intermediate product is quite stiff, having the consistency of heavy grease. The reduction in the water content of the insecticide may thus be taken advantage of when shipping the insecticidal composition to the point of use. The increase in the amount of carbon black results in a somewhat increased spreading power, with a resultant beneficial effect on the kill of insects. Somewhat longer agitation is usually necessary in order to prepare from this more concentrated mixture the insecticidal suspension of carbon black to be sprayed upon the vegetation.

It is within the scope of the invention to substitute for the whale oil soap, sulphonated oil, or other emulsifying agent having an insecticidal action,—or well known emulsifying agents which do not possess such action, in which latter instance the composition is preferably fortified by means of a relatively small amount of a toxic insecticidal agency such as nicotine. The carbon black component of the preparation here performs its usual function as a very effective spreading agent and as an activator for the relatively small amount of the insecticidal agency employed.

The carbon black employed may if desired be replaced in whole or in part by other similar solid products formed by the partial oxidation of hydrocarbons, tar, resin, and other carbonaceous materials. An example of such products is lampblack. Similarly, carbon black and lampblack produced by thermal decomposition of gaseous and liquid hydrocarbons in well known manner may be effectively employed in my insecticidal preparation.

Another method for producing a stable carbon black suspension consists in passing through a colloid mill of any well known character a mixture of dry carbon black and water. If desired, any emulsifying agent such as, whale oil, soap or saponin in even extremely minute amounts, may be added to either or both ingredients prior to passing them through the mill, or it may be added to the suspension after its formation. Insecticidal agencies may also be incorporated.

The employment of materials such as whale oil soap in the preparation of insecticides is already known. In such instances the compositions prepared contain substantial amounts of well known powerful toxic agents such as Paris green, lime-sulphur, calcium arsenate, creosote, turpentine, nitric acid and the like,—and is of such physical nature that it may not ordinarily be employed in the form of a dilute suspension, so that if an attempt were made to use such a mixture as a spray, it would result in the clogging of the parts of the pressure-operated spraying apparatus. Furthermore such materials normally would not form stable suspensions of the solids present in the composition. In many instances such insecticides comprise components which, while injurious to the insects to be killed, act as poisons to the vegetation so as to materially injure or destroy the latter, such as certain types of oil emulsions. The insecticide comprising carbon black made according to the present invention may be, and preferaby is substantially neutral in reaction and the components thereof do not substantially interact chamically. It may be given any desired alkalinity, however, by the addition of suitable alkaline emulsifying agents, protective colloids, and the like.

By employing an insecticidal preparation according to the present invention as hereinbefore described and set forth in the appended claims, it is possible in a simple manner to substantially eradicate from growing vegetation and particularly from trees, such as fruit trees, evergreen trees and the like, insect pests, especially those of the sucking variety in a manner to prevent any concurrent injury to the vegetation by the treatment.

I claim:

1. An insecticidal spray composition that is non-injurious to foliage comprising a finely divided gas black in colloidal suspension in a substantially neutral aqueous liquid containing an emulsifying agent.

2. An insecticidal composition that is non-injurious to foliage comprising gas black colloidally suspended in a dilute non-alkaline aqueous solution of a water soluble emulsifying agent.

3. An insecticidal composition that is non-injurious to foliage consisting of carbon black colloidally suspended in a dilute aqueous soap solution containing less than 1 per cent of a water soluble soap.

4. An insecticidal spray composition that is non-injurious to foliage comprising a relatively small amount of carbon black colloidally suspended in an extremely dilute solution of a water-soluble emulsifying agent having insecticidal properties, the said composition being substantially free from oils.

5. An insecticidal spray composition that is non-injurious to foliage comprising a colloidal suspension of carbon black in a dilute aqueous solution containing a water-soluble emulsifying agent and a small amount of a water soluble toxic insecticidal agency.

6. An insecticidal spray composition that is non-injurious to foliage consisting of a colloidal suspension of carbon black in a dilute solution containing a water-soluble emulsifying agent having insecticidal properties and less than .05% of a water soluble toxic insecticidal compound.

7. A readily deflocculable insecticide concentrate, suitable for use with commercial spray rigs, the solid ingredients of which comprise in major part an intimate mixture of a water soluble soap and carbon black.

KARL H. FULTON.